United States Patent
Saito et al.

(10) Patent No.: US 7,418,713 B2
(45) Date of Patent: Aug. 26, 2008

(54) COMPONENT PROCESSING SYSTEM AND COMPONENT PROCESSING METHOD

(75) Inventors: Minoru Saito, Tokyo (JP); Daisuke Imamura, Tokyo (JP)

(73) Assignees: Toshiba Solutions Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 378 days.

(21) Appl. No.: 11/009,092

(22) Filed: Dec. 13, 2004

(65) Prior Publication Data
US 2005/0138336 A1 Jun. 23, 2005

(30) Foreign Application Priority Data
Dec. 18, 2003 (JP) .............................. 2003-421629

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/316; 719/328

(58) Field of Classification Search ................. 719/316, 719/328, 330
See application file for complete search history.

(56) References Cited

U.S. PATENT DOCUMENTS

| | | | | |
|---|---|---|---|---|
| 5,475,817 | A * | 12/1995 | Waldo et al. | 719/316 |
| 5,732,261 | A * | 3/1998 | Savitzky et al. | 707/103 R |
| 6,697,878 | B1 * | 2/2004 | Imai | 719/316 |
| 6,795,968 | B1 * | 9/2004 | Sobeski et al. | 719/316 |
| 6,951,021 | B1 * | 9/2005 | Bodwell et al. | 719/316 |
| 6,976,261 | B2 * | 12/2005 | Callsen et al. | 719/316 |
| 2002/0046240 | A1 * | 4/2002 | Graham et al. | 709/203 |
| 2004/0045010 | A1 * | 3/2004 | Kondo et al. | 719/316 |
| 2004/0216147 | A1 * | 10/2004 | Yanosy et al. | 719/328 |

FOREIGN PATENT DOCUMENTS

JP 2002-49496 2/2002

OTHER PUBLICATIONS

Decouchant, D., "Design of a distributed object manager for the Smalltalk-80 system", 1986, ACM Press, N. Meyrowitz, Ed. OOPLSA '86, pp. 444-452.*
Lewandowski, S. M., "Frameworks for component-based client/server computing", Mar. 1998, ACM Comput. Surv. 30, 1 , pp. 3-27.*

* cited by examiner

*Primary Examiner*—Meng-Ai An
*Assistant Examiner*—KimbleAnn Verdi
(74) *Attorney, Agent, or Firm*—Oblon, Spivak, McClelland, Maier & Neustadt, P.C.

(57) ABSTRACT

To provide a component processing system and a component processing method in which components used by a plurality of applications are centrally managed, thereby enabling efficient response to changes in the components. Component environment definition information that shows locations of components used by the individual applications is composed of a component location definition information that defines the locations of the components, a component use definition information that defines the components to be used; and an application location definition information that includes an information designating the component use definition information corresponding to the individual applications. In response to a request from the application, a component managing unit in a framework requests a middleware to acquire the location of the component to be used by this application, and the middleware reads the component environment definition information to respond to the component managing unit.

6 Claims, 12 Drawing Sheets

COMPONENT PROCESSING SYSTEM AND COMPONENT PROCESSING METHOD

CROSS-REFERENCE TO RELATED APPLICATIONS

This application is based upon and claims the benefit of priority from the prior Japanese Patent Application No. 2003-421629, filed on Dec. 18, 2003; the entire contents of which are incorporated herein by reference.

BACKGROUND

1. Field of the Invention

The present invention relates to a component processing system and a component processing method for operating an application using a component.

2. Description of the Related Art

A component means a software component implemented with business logic and so on for configuring an application. EJB (Enterprise Java Beans (registered trademark)) that is a code proposed by Sun Microsystems, Inc. in US, and so on are examples thereof. The EJB is a standard component architecture for configuring distributed-object-oriented business applications in JAVA (registered trademark) programming language, and it enables configuring distributed applications by combining components that are developed by using tools of different vendors. The use of the EJB allows a developer to be dedicated only to the development of the business logic when developing applications, so that efficient application development is made possible.

In the EJB architecture, a container provides an execution environment of the EJB component. Normally, this container is managed by an EJB server. When an EJB client (application) requests the container to create an object of EJB via a standardized interface provided by the container, the container reads description, which is called Deployment Descriptor, defining operational conditions (attribute values of transaction management, security management, and so on) of the component and installs the component based on the operational conditions to create an object. Consequently, an executable component is created (see, for example, Japanese Patent Application Laid-open No. 2002-49496).

SUMMARY

Figure 12:
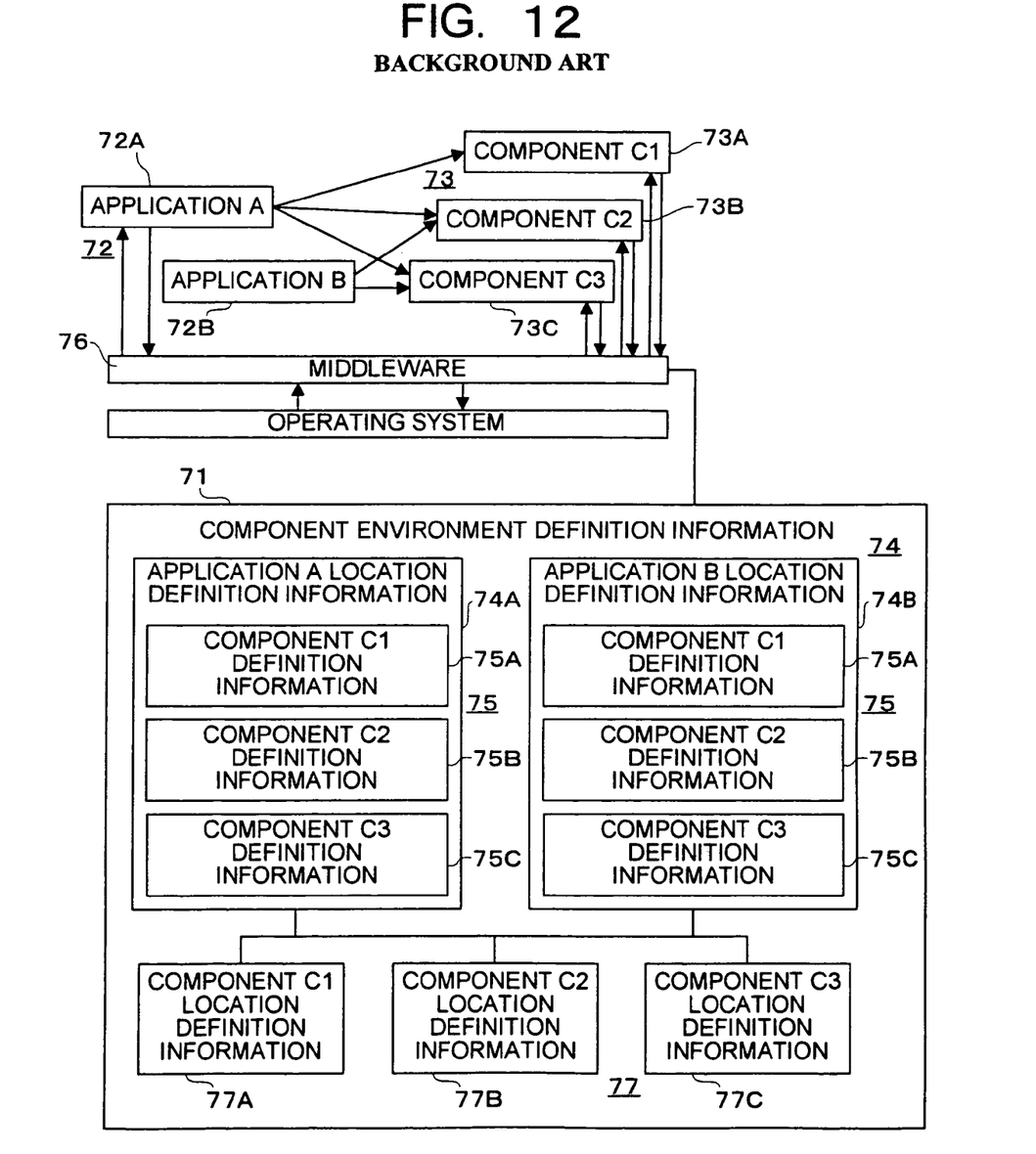
FIG. 12 is a diagram showing the configuration of a typical component processing system.

FIG. 12 is a diagram showing the configuration of a typical component processing system. The definition information for component environment 71 (herein after "component environment definition information") defines locations and so on of components 73 (73A, 73B, 73C) used by applications 72 (72A, 72B). In response to a request for the use of the component 73 from the application 72, a middleware 76 reads the component environment definition information 71 to recognize the location of the component 73 to be used by the application 72. This means that the application 72 uses the component 73 whose object has been created by the middleware 76.

The component environment definition information 71 is composed of location definition information 74 (application A location definition information 74A, application B location definition information 74B) for the respective applications 72. In each of the definition information for application location 74 (herein after "application location definition information"), information 75 (component C1 definition information 75A, component C2 definition information 75B, component C3 definition information 75C) that defines the components 73 to be used by each of the applications 72 is commonly described. Based on the information 75, the definition information for component location 77 (herein after "component location definition information"; component C1 location definition information 77A, component C2 location definition information 77B, component C3 location definition information 77C) describing the location of the relevant component 73 is acquired, so that the location of the component 73 is found.

However, each of the application location definition information 74 includes the information 75 that defines the components 73 to be used by the applications 72 as described above, and therefore, when some change occurs in the components 73 commonly used by the applications 72, the same change has to be made in each of the application location definition information 74. This has been problematic since management of the components becomes complicated. Further, when the application location definition information 74 for the plural applications 72 is newly set, the information 75 defining the components 73 needs to be commonly described. This is troublesome because this work takes an enormous amount of time, and in addition, processing load on the middleware 76 is very heavy since the middleware 76 takes on centralized management of the components.

Further, in the EJB architecture, the container reads the behavior definition information of a component to create an executable component as described above, but the location of the behavior definition information is determined by a container vendor and the container is implemented with a function of accessing information on the location. Moreover, the form of the behavior definition information is also dependent on the container. Specifically, in the EJB architecture, many restrictions are imposed on the location of the definition information, its description form, and its definition contents, which has impaired a degree of freedom of system designing and has blocked improvement in development efficiency.

Therefore, in the prior art, when some change occurs in the component used by the applications, the same change has to be made in the component environment definition information of all the applications using this component, as described above. This has posed a problem of increase in management cost and deterioration of development efficiency. There has been another problem that the middleware is burdened with a very heavy processing load because it takes on the centralized management of the components. In addition, the restrictions imposed on the location, description form, and definition contents of the definition information for component behavior (herein after "component behavior definition information") have impaired the freedom degree of system designing and deteriorated development efficiency.

The present invention was devised to solve these problems, and an object thereof is to provide a component processing system and a component processing method in which components used by a plurality of applications are centrally managed, thereby enabling efficient response to a change in the components used by the applications.

It is another object of the present invention to provide a component processing system and a component processing method allowing the change in behaviors of components with a high degree of freedom and enabling a higher degree of freedom of system designing.

In order to attain the objects stated above, a component processing system according to one of the aspects of the present invention includes: a middleware operating on an operating system; a framework operating on the middleware; at least one application operating on the framework; a plurality of components selectively usable by the application; a memory storing a component environment definition information having a component location definition information that defines locations of the individual components, a component use definition information that defines the components to be used, and an application location definition information that includes an information designating the component use definition information corresponding to the application; a component managing unit that is provided in the framework and that requests the middleware to acquire the location of the component to be used by the application in response to a request from the application and requests the component existing in the location which is acquired as a response to create an own object; and a component environment definition information reading unit that is provided in the middleware and that acquires, in response to the request from the component managing unit, the location of the component to be used by the application from the component environment definition information stored in the memory to respond to the component managing unit.

According to this invention, the component managing unit provided in the framework centrally manages the components used by the individual applications based on the component environment definition information. This brings about effects of reducing management cost and improving development efficiency, and in addition, of lightening the processing load on the middleware, which has conventionally taken on the centralized management of object creation of the components.

A component processing system according to another aspect of the present invention includes: a middleware operating on an operating system; a framework operating on the middleware; at least one application operating on the framework; a plurality of components selectively usable by the application; a first memory storing a plurality of pieces of behavior definition information that define behaviors of the individual components respectively; a second memory storing a component environment definition information having a component location definition information that defines locations of the individual components, a component use definition information that defines the components to be used, and an application location definition information that includes an information designating the component use definition information corresponding to the application; a component managing unit that is provided in the framework and that requests the middleware to acquire the location of the component to be used by the application in response to a request from the application and requests the component existing in the location which is acquired as a response to create an own object while giving to the component an operational condition based on the behavior definition information stored in the first memory; and a component environment definition information reading unit that is provided in the middleware and that acquires, in response to the request from the component managing unit, the location of the component to be used by the application from the component environment definition information stored in the second memory to respond to the component managing unit.

According to this invention, the component managing unit provided in the framework centrally manages the components used by the individual applications based on the component environment definition information. This makes it possible to customize the behaviors of the components with a high degree of freedom by freely changing the behavior definition information at the development or designing stage of the components, so that the degree of freedom of system designing and applicability to other systems can be enhanced. Further, this invention exhibits an effect of lightening the processing load on the middleware which has conventionally taken on the centralized management of object creation of the components.

According to the component processing system and the component processing method, it is possible to centrally manage the components used by the individual applications based on the component environment definition information, so that management cost can be reduced and development efficiency can be improved. In addition, the behaviors of the components can be changed with a high degree of freedom, so that a degree of freedom of system designing can be enhanced.

BRIEF DESCRIPTION OF THE DRAWINGS

FIG. 4 is a view showing an example of application location definition information in a prior art.

DETAILED DESCRIPTION

Hereinafter, embodiments of the present invention will be described with reference to the drawings.

Figure 1:
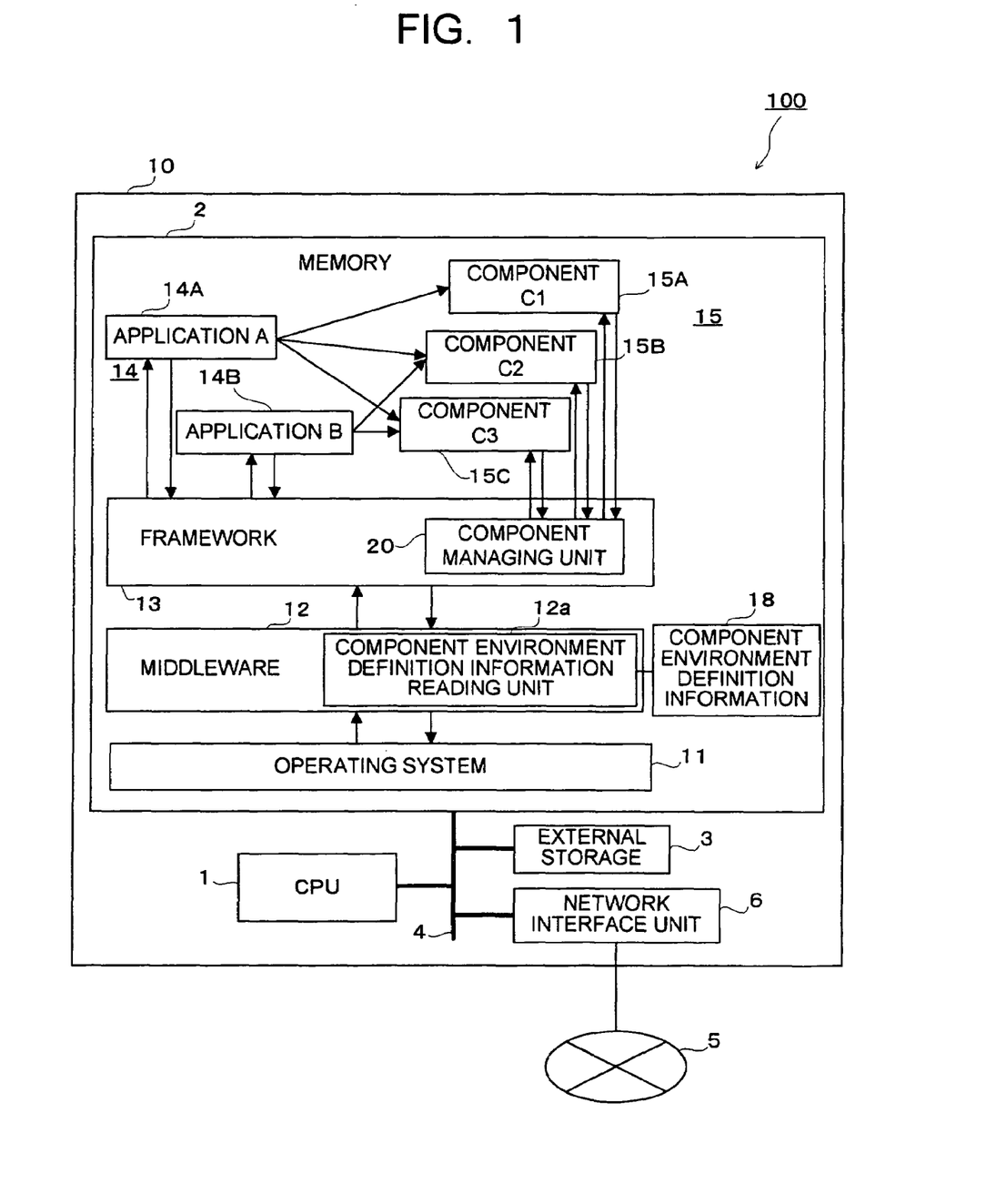
FIG. 1 is a diagram showing the configuration of a component processing system according to a first embodiment of the present invention.

FIG. 1 is a diagram showing the configuration of a component processing system 100 according to a first embodiment of the present invention.

As shown in the drawing, the component processing system 100 is configured on a computer 10 having a typical computer architecture such as a CPU 1, a memory 2, an external storage 3, and a bus 4. The computer 10 is connected to a network 5 such as the Internet and LAN via a network interface unit 6.

The component processing system 100 has as its software elements: an operating system 11 (hereinafter, referred to as an "OS 11"); a middleware 12 operating on the OS 11; a framework 13 operating on the middleware 12; applications 14 (14A, 14B) operating on the framework 13; components 15 (15A, 15B, 15C) each implemented with a logic used by the applications 14; component environment definition information 18; and a component managing unit 20 that is provided in the framework 13 and that requests the middleware 12, in response to a request from the application 14, to acquire a location of the component 15 to be used by the application 14 and responds to the application 14. Here, the number of the applications 14 is two and the number of the components 15 is three, but they are not limited to any specific numbers. The component managing unit 20 is plugged in the framework 13.

The middleware 12, which is synonymous with an application server, executes transaction processing, load distribution processing, and database processing. A component environment definition information reading unit 12a is provided in the middleware 12. The component environment definition information reading unit 12a has a function of acquiring, in response to the request from the component managing unit 20, the location of the component 15 to be used by the application 14 from the component environment definition information 18, to respond to the component managing unit 20.

The component environment definition information 18 is a definition text showing the locations of the components 15 used by the individual applications 14 to the component managing unit 20. Specifically, as shown in FIG. 2, the component environment definition information 18 has a plurality pieces of component location definition information 16 (component C1 location definition information 16A, component C2 location definition information 16B, component C3 location definition information 16C) that define the locations of the respective components 15 (component C1, component C2, component C3), definition information for component use 17 (herein after "component use definition information") that defines the components to be used by the applications 14, and application location definition information 19 (application A location definition information 19A, application B location definition information 19B) that includes information 21 (21A, 21B) designating the component use definition information 17 corresponding to the individual applications 14.

Figure 2:
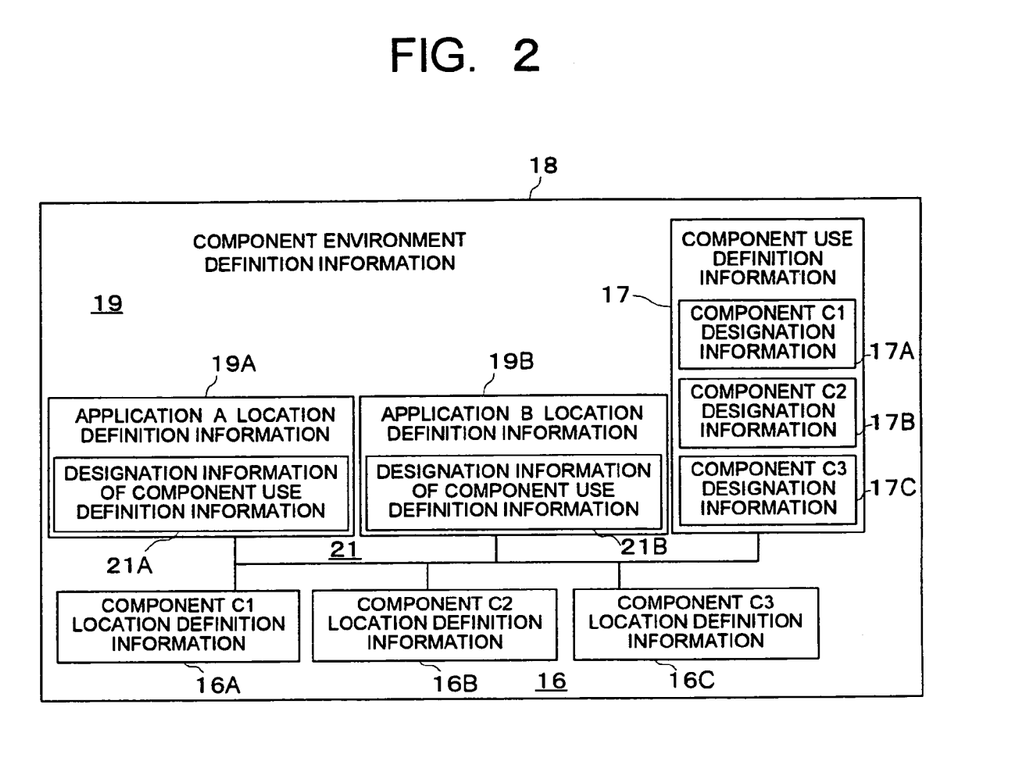
FIG. 2 is a diagram showing the composition of component environment definition information.

In the example in FIG. 2, the application A and the application B use the three components C1, C2, C3. In the component use definition information 17, described are pieces of information that designate the three components C1, C2, C3 (component C1 designation information 17A, component C2 designation information 17B, component C3 designation information 17c) respectively. Therefore, the designation information 21A in the application A location definition information 19A and the designation information 21B in the application B location definition information 19B designate the same component use definition information 17. When the individual applications A, B use a combination of different components, it is a matter of course that a plurality of pieces of the component use definition information 17 describing the combination of the different components are prepared, and the designation information 21A of the component use information in the application A location definition information 19A and the designation information 21B of the component use definition information in the application B location definition information 19B can designate the different pieces of the component use definition information 17. It is preconditioned that the component environment definition information 18 is read by the middleware 12, and therefore, its location, description form, definition contents are determined within a restriction range of the middleware 12.

Figure 3:
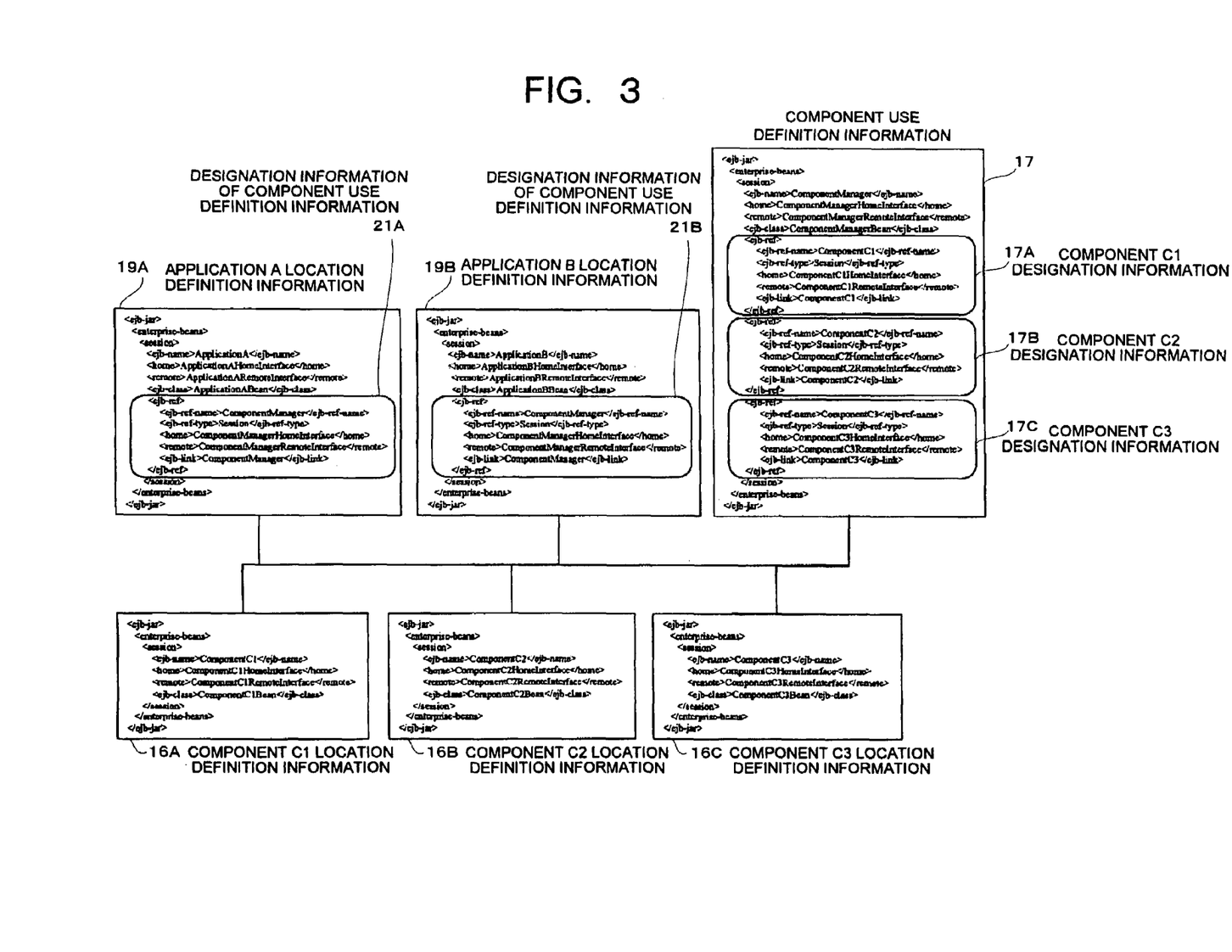
FIG. 3 is a view showing an example of the component environment definition information.

FIG. 3 is a description example of the component environment definition information 18 in XML (extensible Mark-up Language) when the application A and the application B commonly use the three components C1, C2, C3.

As described above, the components 15 used by the individual applications 14 can be centrally managed based on the component environment definition information 18. This makes it possible to change the relation between the applications 14 and the components 15 simply by changing the contents of the component use definition information 17 in the component environment definition information 18. Consequently, management cost can be reduced and development efficiency can be improved.

In this connection, FIG. 4 shows an example where information 23A and information 23B designating the components used by the applications A, B are described in respective application location definition information 19A, 19B according to a conventional method. As shown in the drawing, it is necessary to separately describe the same information 23A, 23B on the components used by their own applications in the respective application location definition information 19A, 19B. Therefore, if some change occurs in a component used by the applications, the application location definition information 19A, 19B has to be rewritten separately for re-change.

Figure 5:
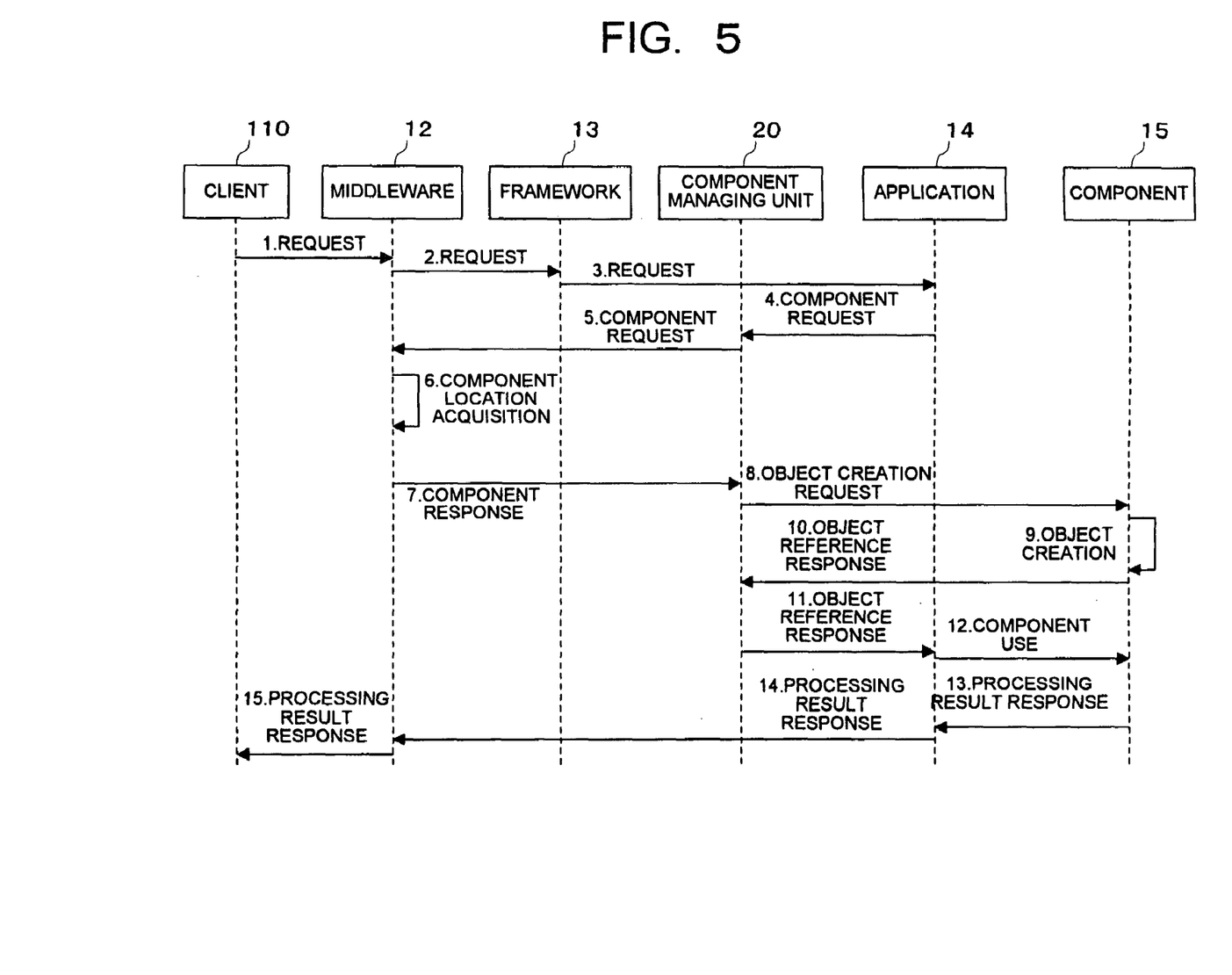
FIG. 5 is a diagram showing an operation procedure of the component processing system in FIG. 1.

Next, the operation procedure of the component processing system 100 will be described with reference to FIG. 5.

First, an application use request from the client 110 is given to the target application 14 through the middleware 12 and the framework 13 (1. request to 3. request). The application 14 receiving the use request gives a request for the component 15 to the component managing unit 20 (4. component request). The component managing unit 20, upon receiving this request, requests the middleware 12 to acquire the location of the component 15 to be used by the application 14 (5. component request).

In response to the request from the component managing unit 20, the middleware 12 reads the location of the component to be used by this application 14 from the component environment definition information 18 (6. component location acquisition), and responds to the component managing unit 20 with information on the target component, to be more specific, an interface for component creation (for example, Home Interface of EJB) (7. component response).

The location of the component is read from the component environment definition information 18 in the following manner. The designation information 21 in the application location definition information 19 corresponding to the requesting application 14 is read from the component environment definition information 18, and the component use definition information 17 is read based on the designation information 21. Since component C1 designation information 17A, component C2 designation information 17B, and component C3 designation information 17C that designate the components are described in the component use definition information 17, the component location definition information 16 (16A, 16B, 16C) of the relevant component is read according to the description, thereby acquiring the location of the component.

The component managing unit 20, upon receiving the component response, gives a predetermined operational condition to the relevant component 15 and at the same time, requests the component 15 to create an object (8. object creation request). The component 15 creates its own object based on the given operational condition (9. object creation), and responds to the component managing unit 20 with reference information (for example, Remote Interface of EJB) to this object (10. object reference response).

Incidentally, since creating a component object at every object creation request would deteriorate use efficiency of hardware resources, the object reference information (for example Remote Interface of EJB) once created may be pooled and the pooled object reference information may be given to the component managing unit 20 as a response to subsequent object creation requests. This will lighten the load on the component managing unit 20 since a component is not created after each request generated according to a user's command.

The component managing unit 20 responds to the requesting application 14 with the object reference information given from the component 15 (11. object reference response). Thereafter, the application 14 gives a request for processing using the component whose object has been created (12. component use). The component 15 receiving this processing request executes the processing based on its own object and returns the result thereof to the application 14 (13. processing result response). The application 14 uses the received processing result to execute processing based on its own implementation and returns the result thereof to the middleware 12 through the framework 13 (14. processing result response). Then, the middleware 12 returns the processing result based on its own implementation to the client 110 (15. processing result response).

Therefore, according to the component processing system 100 of this embodiment, the components 15 used by the individual applications 14 can be centrally managed based on the component environment definition information 18. More specifically, only by changing the contents of the component use definition information 17 in the component environment definition information 18, it is possible to change the relation between the applications 14 and the components 15 without any complicated process. This can reduce management cost and improve development efficiency.

Figure 6:
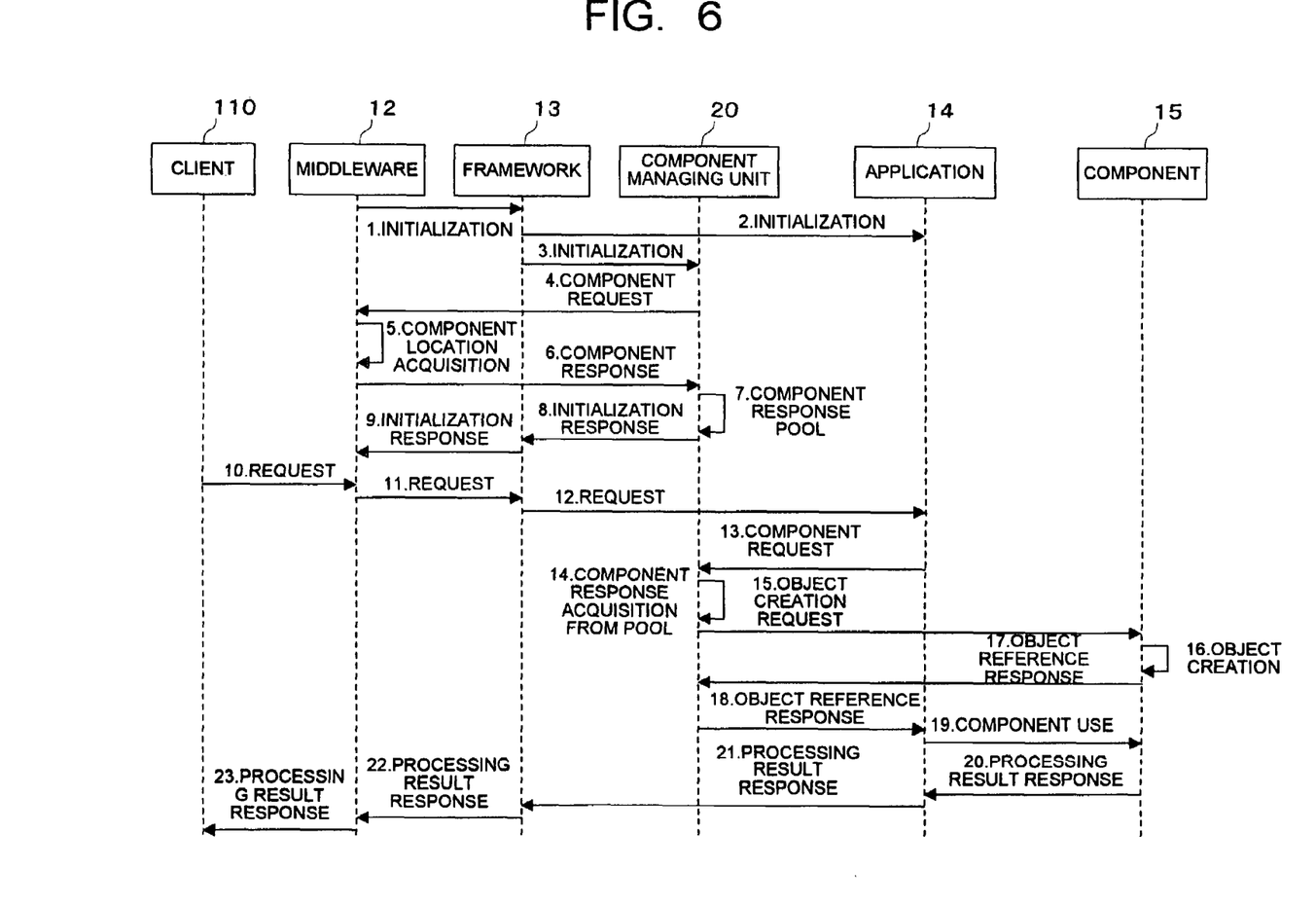
FIG. 6 is a diagram showing another operation procedure of the component processing system according to the first embodiment.

Next, an operation of a component processing system 200 in which an interface for component creation (for example, Home Interface of EJB) being created by the middleware 12 is pooled in a component managing unit 20 at the initialization will be described as a modification example of this embodiment with reference to FIG. 6.

First, a middleware 12 initializes a framework 13 (1. initialization), and the framework 13 initializes an application 14 and a component managing unit 20 at its own initialization (2. initialization, 3. initialization).

The component managing unit 20, after being initialized, gives a component request to the middleware 12 (4. component request). In response to the component request, the middleware 12 reads a location of the component to be used by the application 14 from component environment definition information 18 (5. component location acquisition), and creates information on the target component, concretely, an interface (for example, Home Interface of EJB) for component creation, to respond to the component managing unit 20 (6. component response).

The component managing unit 20 pools the information on the component (the interface for component creation) which is given from the middleware 12 as a response (7. component response pool). Thereafter, the component managing unit 20 notifies the framework 13 of initialization completion (8. initialization response). Subsequently, the framework 13 notifies the middleware 12 of initialization completion (9. initialization response).

Subsequently, a client 110 gives an application use request to the target application 14 through the middleware 12 and the framework 13 (10. request to 12. request). The application 14 receiving the use request gives a request for the component 15 to the component managing unit 20 (13. component request). The component managing unit 20, upon receiving this request, acquires the component information pooled in itself (14. component response acquisition from a pool), and based on the component information, it requests the relevant component 15 to create an object and gives an operation condition thereto (15. object creation request). The component 15 creates its own object based on the given operational condition (16. object creation) and responds to the component managing unit 20 with reference information (for example, Remote Interface of EJB) to this object (17. object reference response).

The component managing unit 20 responds to the requesting application 14 with the object reference information given from the component 15 (18. object reference response). Thereafter, the application 14 gives a request for processing using the component 15 whose object has been created (19. component use). The component 15 receiving this processing request executes the processing based on its own object and returns the result thereof to the application 14 (20. processing result response). The application 14 uses the received processing result to execute processing based on its own implementation and returns the result thereof to the middleware 12 through the framework 13 (21. processing result response, 22. processing result response). Then, the middleware 12 returns the processing result thereof to the client 110 based on its own implementation (23. processing result response).

Thus pooling the component information in the component managing unit 20 eliminates a need for creating the component information at each request, resulting in a quicker response to a request.

Next, other embodiments of the present invention will be described.

Figure 7:
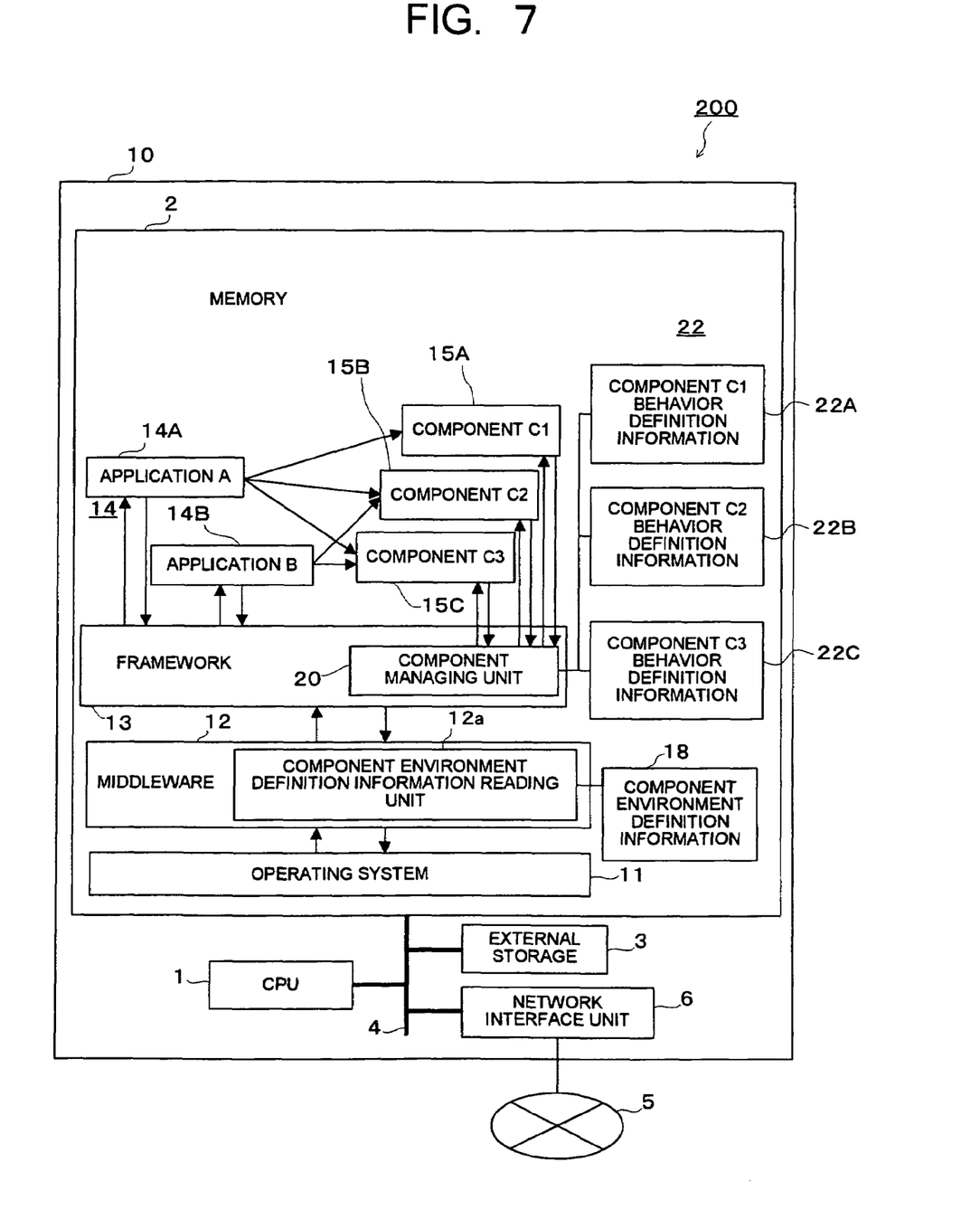
FIG. 7 is a diagram showing the configuration of a component processing system according to a second embodiment of the present invention.

FIG. 7 is a diagram showing the configuration of a component processing system 200 according to a second embodiment of the present invention. As shown in the drawing, the component processing system 200 is configured such that component behavior definition information 22 (component C1 behavior definition information 22A, component C2 behavior definition information 22B, component C3 behavior definition information 22C) directly readable by the component managing unit 20 provided in the framework 13 is added to the component processing system 100 of the previous embodiment shown in FIG. 1.

Incidentally, in the example in this drawing, one component behavior definition information 22 is provided for each kind of components, but the plural pieces of component behavior definition information 22 may be prepared for one component.

It can be defined in the application location definition information 19 which component behavior definition information 22 is to be read. For example, it may be defined in the application location definition information 19 or in the component use definition information 17 shown in FIG. 2. Alternatively, definition information for designating the component behavior definition information 22 may be separately prepared. In any case, the location of the component behavior definition information 22 is described as the information designating the component behavior definition information 22, so that the component's behavior can be customized with a high degree of freedom by freely changing the behavior definition information at the component development or designing stage, and this realizes a higher degree of freedom of system designing and enhanced applicability to other systems. Further, the restrictions which have conventionally been imposed on the location, form, and definition contents of the component behavior definition information dependent on the middleware are eliminated, so that a degree of freedom of component-type software development and development efficiency can be enhanced.

Figure 8:
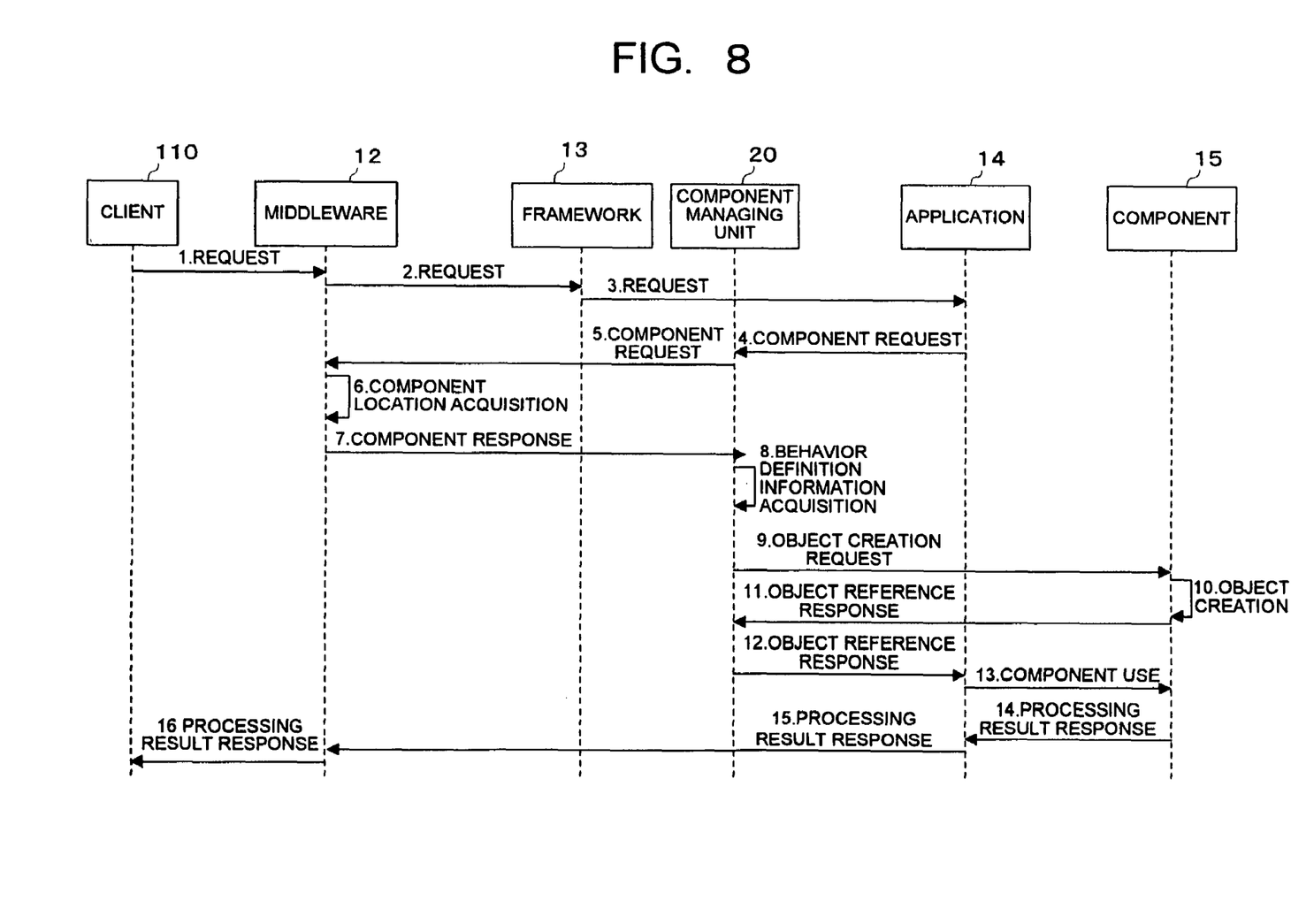
FIG. 8 is a diagram showing an operation procedure of the component processing system in FIG. 7.

Next, the operation procedure of the component processing system 200 will be described with reference to FIG. 8.

First, the client 110 gives an application use request to the target application 14 through the middleware 12 and the framework 13 (1. request to 3. request). The application 14 receiving the use request gives a request for the component 15 to the component managing unit 20 (4. component request). The component managing unit 20, upon receiving this request, requests the middleware 12 to acquire the location of the component 15 to be used by this application 14 (5. component request).

In response to the request from the component managing unit 20, the middleware 12 reads the location of the component 15 to be used by the application 14 from the component environment definition information 18 (6. the component location acquisition), and creates an interface (for example, Home Interface of EJB) for component creation, to respond to the component managing unit 20. Further, at this time, the middleware 12 reads the location of the component behavior definition information 22 that defines the behavior of the component 15 to be used from the component environment definition information 18 and gives it to the component managing unit 20 together with the component location as a response (7. component response).

The component managing unit 20, upon receiving this response, reads the component behavior definition information 22 corresponding to this component 15 (8. behavior definition information acquisition), then the component managing unit 20 gives to the component 15 an object creation request as well as the operational condition based on the contents of the component behavior definition information 22 (9. object creation request). The component 15 creates its own object, taking the given operational condition into consideration (10. object creation) and responds to the component managing unit 20 with the reference information to this object (for example Remote Interface of EJB) (11. object reference response).

Incidentally, creating a component object at every object creation request would deteriorate use efficiency of hardware resources, and therefore, the object reference information once created may be pooled and the pooled object reference information may be given to the component managing unit 20 as a response to subsequent object creation requests.

The component managing unit 20 responds to the requesting application 14 with the object reference information given from the component 15 (12. object reference response). Thereafter, the application 14 gives a request for processing using the component whose object has been created (13. component use). The component 15 receiving this processing request executes the processing based on its own object and returns the result thereof to the application 14 (14. processing result response). The application 14 uses the received processing result to execute processing based on its own implementation and returns the result thereof to the middleware 12 through the framework 13 (15. processing result response). Then, the middleware 12 returns the processing result to the client 110 based on its own implementation (16. processing result response).

Therefore, according to the component processing system 200 of this embodiment, the restrictions which have conventionally been imposed on the location, form, and definition contents of the operational condition definition information dependent on the middleware 12 are eliminated, which allows a change in component behavior with a high degree of freedom and enables an enhanced degree of freedom of system designing.

Figure 9:
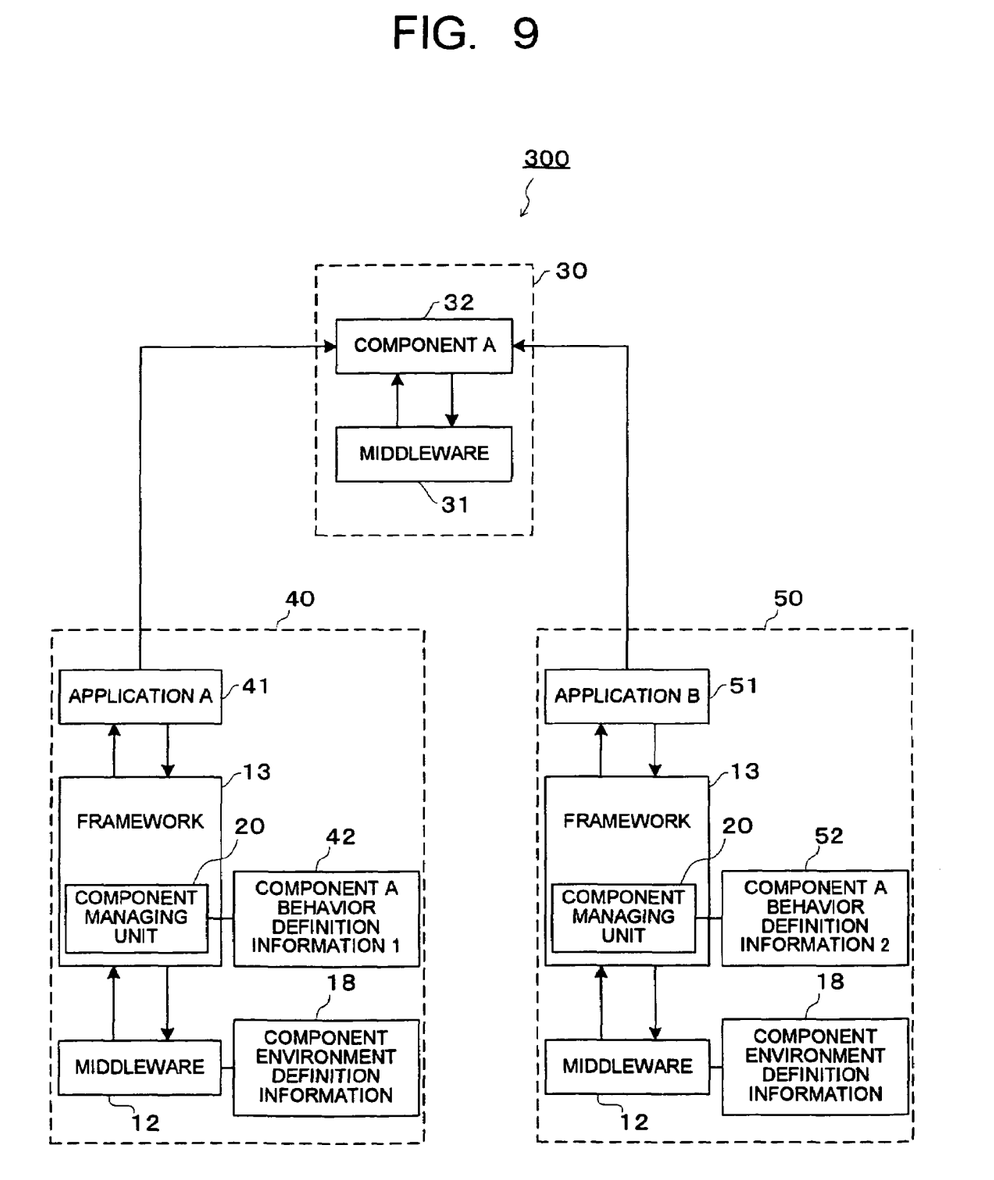
FIG. 9 is a diagram showing a modification example of the component processing system according to the second embodiment.

FIG. 9 shows a state in which a component 32 whose object is created and which is executed on a middleware 31 of a computer 30 is shared by different applications 41, 51 operating on other plural computers 40, 50. Here, different contents are defined in component behavior definition information 42, 52 of the respective applications 41, 51, so that the component 32 behaves differently in the respective applications 41, 51.

Next, as a third embodiment of the present invention, a component processing system 300 in a distributed environment will be described. The component processing system 300 in the distributed environment is a mechanism for processing components distributed in a plurality of computers.

Figure 10:
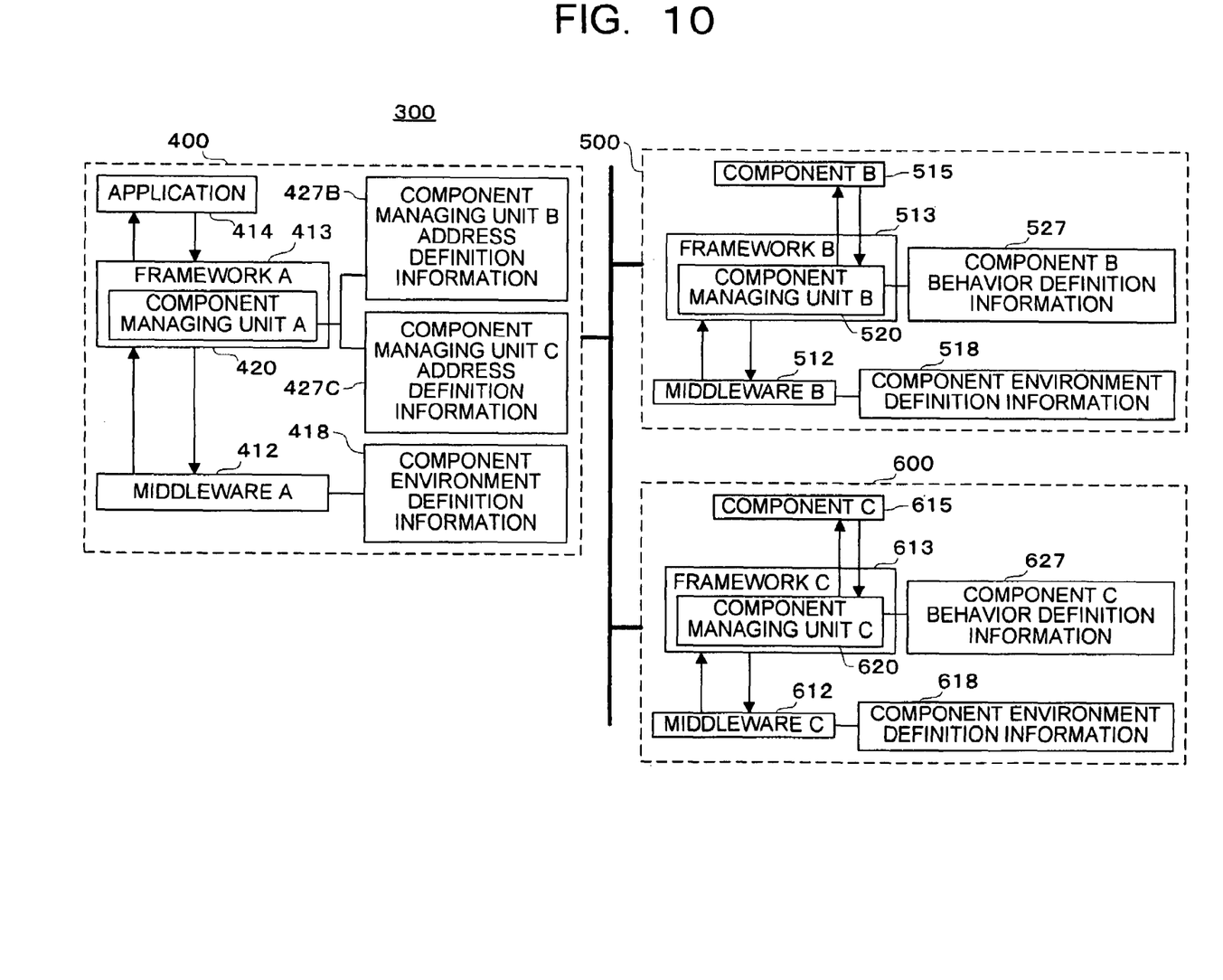
FIG. 10 is a diagram showing the configuration of a component processing system in a distributed environment according to a third embodiment of the present invention.

FIG. 10 is a diagram showing an example of the component processing system 300 in the distributed environment.

As shown in the drawing, the component processing system 300 is constituted of a computer 400 that processes component use requests and one or more computers 500, 600 that provide components in response to the request.

In the computer 500 which is one of the component-providing computers, a framework B (513) is implemented with, as a component, a component managing unit B (520) for managing a component B (515) implemented with a business logic. The component managing unit B (520) defines the behavior of the component B (515) based on component B behavior definition information 527 directly readable by itself. A middleware B (512) is capable of acquiring the location of the component B (515) from component environment definition information 518.

Similarly, in the other component-providing computer 600, a framework B (613) is implemented with, as a component, a component managing unit C (620) for managing a component C (615) implemented with a business logic. The component managing unit C (620) defines the behavior of the component C (615) based on component C behavior definition information 627 directly readable by itself. A middleware C (612) is capable of acquiring the location of the component C (615) used by the component managing unit C (620) from component environment definition information 618.

A framework A (413) in the component-requesting computer 400 is implemented with a component managing unit A (420) for managing the component managing units B (520), C (620) which are installed as components in the component-providing computers 500, 600. Information on component managing units that are objects of management by the component managing unit A (420) is described in component environment definition information 418 directly readable by a middleware A (412). That is, in this example, it is described that the component managing unit B (520) and the component managing unit C (620) are the objects of management by the component managing unit A (420).

Component managing unit B address definition information 427B has description of address information of the component managing unit B (520) which is an object of management by the component managing unit A (420). Component managing unit C address definition information 427C has description of address information of the component managing unit C (620) which is another object of management by the component managing unit A (420).

Figure 11:
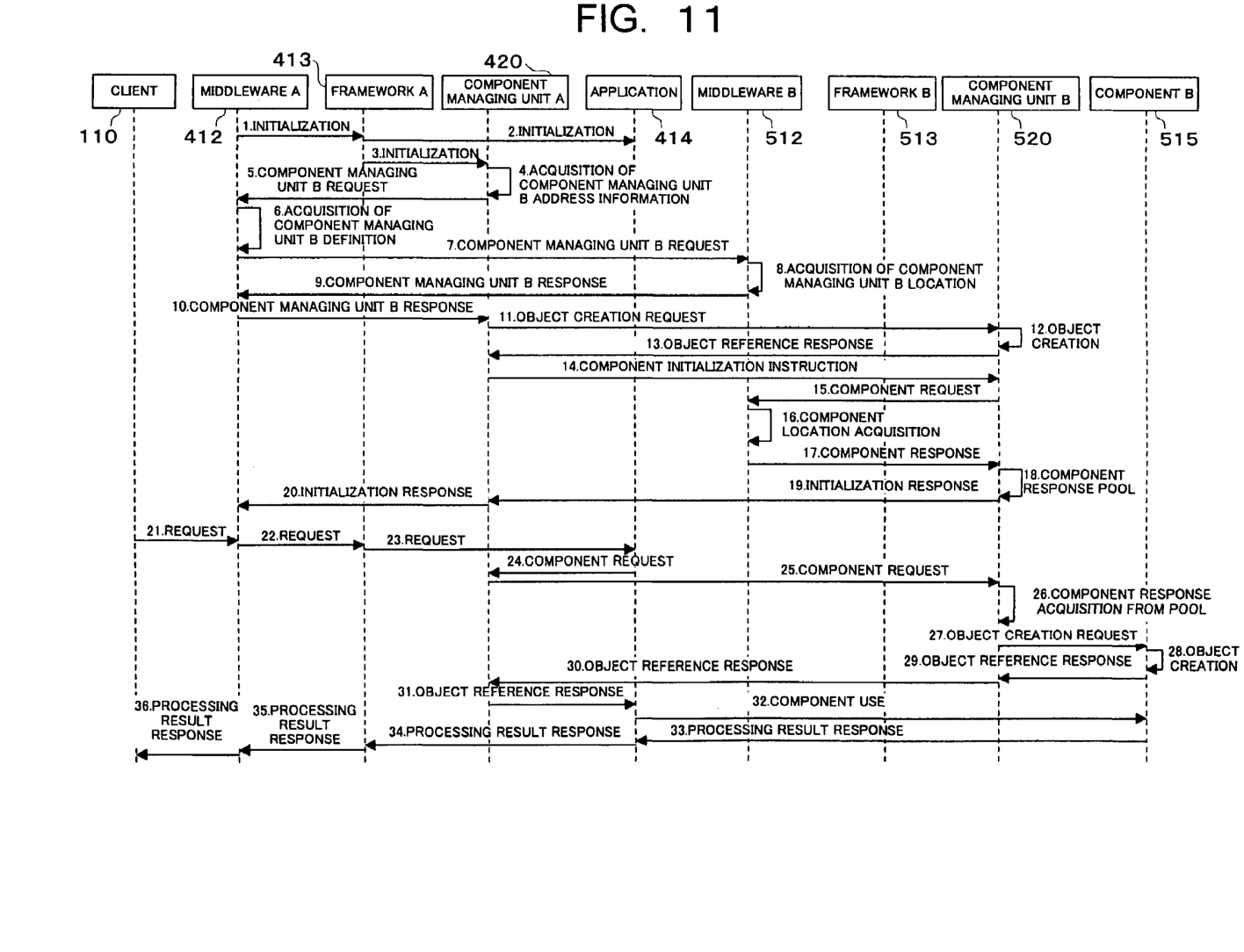
FIG. 11 is a diagram showing an operation procedure of the component processing system in the distributed environment in FIG. 10.

Next, FIG. 11 will be used to describe the operation of the component processing system 300 in the distributed environment when the application 414 on the component-requesting computer 400 uses the component B (515) on the other computer 500.

First, the middleware A (412) initializes the framework A (413) (1. initialization) and the framework A (413) initializes the application 414 and the component managing unit A (420) at its own initialization (2. initialization, 3. initialization).

The component managing unit A (420), after being initialized, reads the component managing unit B address information 427B to acquire the address information of the component managing unit B (520) which is one of the objects of management by the component managing unit A (420) (4. acquisition of component managing unit B address information), and thereafter, gives a request for the component managing unit B (520) to the middleware A (412) (5. component managing unit B request).

The middleware A (412) receiving this request judges from the component environment definition information 418 that the component managing unit B (520) is an object of management by the component managing unit A (420) (6. acquisition of component managing unit B definition), and gives a request for the component managing unit B (520) to the middleware B (512) on the computer 500 (7. component managing unit B request).

The middleware B (512) on the computer 500, upon receiving this request, acquires the location of the component managing unit B (520) (8. acquisition of component managing unit B location) and creates an interface (for example, Home Interface of EJB) for creating an component of the component managing unit B to give it to the middleware A (412) on the computer 400 as a response (9. component managing unit B response).

The middleware A (412) on the computer 400, upon receiving this response, gives this response to the component managing unit A (420) (10. component managing unit B response). The component managing unit A (420) requests the component managing unit B (520) to create an object based on the received response (11. object creation request).

The component managing unit B (520) creates its own object in response to this request (12. object creation) and responds to the component managing unit A (420) with reference information to this object (for example, Remote Interface of EJB) (13. object reference response).

Thereafter, the component managing unit A (420) gives an initialization instruction to the component managing unit B (520) whose object has been created (14. component initialization instruction). The component managing unit B (520) gives a request for the component B (515) to the middleware B (512) at its own initialization (15. component request).

In response to the component request, the middleware B (512) acquires the location of the component B (515) from the component environment definition information 518 (16. component location acquisition), and responds to the component managing unit B (520) with information on the component B (515), specifically, an interface (for example, Home Interface of EJB) for creating the component B (515).

The component managing unit B (520) pools the information on the component B (515) given as a response (18. component response pool), and thereafter notifies the component managing unit A (420) of initialization completion information (19. initialization response). The component managing unit A (420) subsequently notifies the middleware A (412) of initialization completion information (20. initialization response).

Subsequently, the client 110 gives an application use request to the application 414 through the middleware A (412) and the framework A (413) (21. request to 23. request). The application 414 receiving the use request gives a request for the component B (515) to the component managing unit A (420) (24. component request).

The component managing unit A (420), upon receiving this request, gives a request for the component B (515) to the component managing unit B (520) (25. component request). The component managing unit B (520) acquires the component information pooled in itself (26. component response acquisition from the pool) and requests the component B (515) to create an object based on the component information, and at the same time, reads the component B behavior definition information 527 to give to this component 15 the operational condition based on the contents of the component B behavior definition information 527 (27. object creation request).

In response to this request, the component B (515) creates its own object in consideration of the operational condition (28. object creation) and responds to the component managing unit B (520) with reference information to this object (for example, Remote Interface of EJB) (29. object reference response). Subsequently, the component managing unit B (520) responds to the component managing unit A (420) with the object reference information (30. object reference response), and the component management unit A (420) further sends the object reference information to the application 414 (31. object reference response).

The application 414 gives a request for the processing using the component B (515) whose object has been created (32. component use). The component B (515) receiving this processing request executes the processing based on its own object and returns the result thereof to the application 414 (33. processing result response). The application 414 uses the received processing result to execute processing based on its own implementation and returns the result thereof to the middleware A (412) through the framework A (413) (34. processing result response, 35. processing result response). Then, the middleware A (412) returns the processing result to the client 110 based on its own implementation (36. processing result response).

The component C (615) on the other computer 600 is also usable from the application 414 through the similar procedure.

As described above, according to the component processing system 300 of this embodiment, the restrictions which have conventionally been imposed on the location, form, and definition contents of the description that defines the behaviors of the individual component B (515) and component C (615) in the distributed environment are eliminated. Consequently, a change in component behavior is allowed with a high degree of freedom and the degree of freedom of system designing can be enhanced.

Hitherto, the embodiments of the present invention have been described, but the present invention is not limited to the embodiments described above. It is a matter of course that various modifications can be made without departing from the spirit of the present invention.

What is claimed is:

1. A component processing system, comprising:
at least one application;
a middleware operating on an operating system, the middleware configured to perform as an application server for said application;
a framework operating between said application and said middleware, the framework configured to share functions of said application and said middleware;
a plurality of components configured to be selectively usable by said application; and
a memory configured to store a component environment definition information having a component location definition information that defines locations of said plurality of components, a component use definition information that defines said plurality of components to be used, and application location definition information that includes information designating the component use definition information corresponding to said at least one application,
wherein said framework includes a component managing unit which is configured to request said middleware to acquire the location of one of said plurality of components to be used by said at least one application in response to a request from said at least one application and requests one of said plurality of components existing in the location which is acquired as a response to create an own object; and
wherein said middleware includes a component environment definition information reading unit which is configured to acquire, in response to the request from said component managing unit, the location of one of said plurality of components to be used by said at least one application from the component environment definition information stored in said memory to respond to said component managing unit.

2. A component processing system, comprising:
- at least one application;
- a middleware operating on an operating system, the middleware configured to perform as an application server for said application;
- a framework operating between said application and said middleware, the framework sharing functions of said application and said middleware;
- a plurality of components configured to be selectively usable by said application;
- a first memory configured to store a plurality of pieces of behavior definition information that define behaviors of said plurality of components respectively; and
- a second memory configured to store a component environment definition information having a component location definition information that defines locations of said plurality of components, a component use definition information that defines said plurality of components to be used, and application location definition information that includes information designating the component use definition information corresponding to said at least one application,
- wherein said framework includes a component managing unit which is configured to request said middleware to acquire the location of one of said plurality of components to be used by said at least one application in response to a request from said at least one application and requests one of said plurality of components existing in the location which is acquired as a response to create an own object while giving to one of said plurality of components an operational condition based on the behavior definition information stored in said first memory; and
- wherein said middleware includes a component environment definition information reading unit which is configured to acquire, in response to the request from said component managing unit, the location of said component to be used by said at least one application from the component environment definition information stored in said second memory to respond to said component managing unit.

3. A component processing method in a computer system that comprises:
- at least one application;
- a middleware configured to operate on an operating system, the middleware configured to perform as an application server for said application;
- a framework operating between said application and the middleware, the framework sharing functions of said application and said middleware;
- a plurality of components configured to be selectively usable by the application; and
- a memory configured to store a component environment definition information having a component location definition information that defines locations of the individual components, a component use definition information that defines the components to be used, and an application location definition information that includes an information designating the component use definition information corresponding to the application, and
said method comprising:
- requesting the middleware to acquire the location of the component to be used by the application in response to a request from the application;
- acquiring the location of the component to be used by the application from the component environment definition information stored in the memory;
- responding to the framework with the location of the acquired component;
- requesting the component existing in the location to create an own object while giving a predetermined operational condition to the component; and
- responding to the application with reference information to the object of the component whose object has been created.

4. A component processing method in a computer system that comprises:
- at least one application;
- a middleware configured to operate on an operating system, the middleware configured to perform as an application server for said application;
- a framework operating between said application and the middleware, the framework sharing functions of said application and said middleware;
- a plurality of components configured to be selectively usable by the application;
- a first memory configured to store a plurality of pieces of behavior definition information that define behaviors of the individual components respectively; and
- a second memory configured to store a component environment definition information having a component location definition information that defines locations of the individual components, a component use definition information that defines the components to be used, and an application location definition information that includes an information designating the component use definition information corresponding to the application, and
said method comprising:
- requesting the middleware to acquire the location of the component to be used by the application in response to a request from the application;
- acquiring the location of the component to be used by the application from the component environment definition information stored in the second memory;
- responding to the framework with the location of the acquired component;
- requesting the component existing in the location to create an object of the component based on the behavior definition information stored in the first memory; and
- responding to the application with reference information to the object of the component whose object has been created.

5. The component processing method of claim 3, further comprising:
- pooling in the framework the information on the component given in the response,
- wherein, in said, requesting the component existing in the location to create an object of the component, the information on the component pooled in the framework is referred when receiving the request for the object creation of the component.

6. The component processing method of claim 4, further comprising:
- pooling in the framework the information on the component given in the response,
- wherein, in said requesting the component existing in the location to create an object of the component the information on the component pooled in the framework is referred when receiving the request for the object creation of the component.

* * * * *